Dec. 26, 1933.                D. F. WARNER                1,941,372
                          ELASTIC FLUID TURBINE
                          Filed Jan. 20, 1932
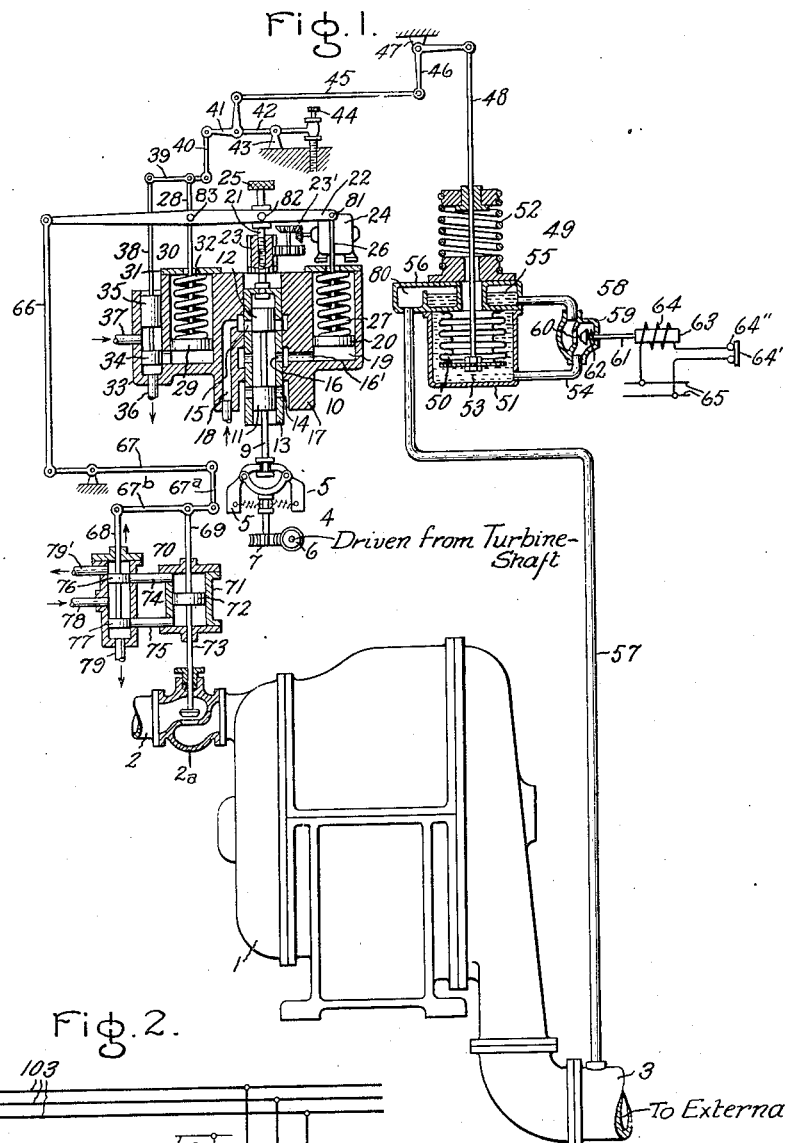
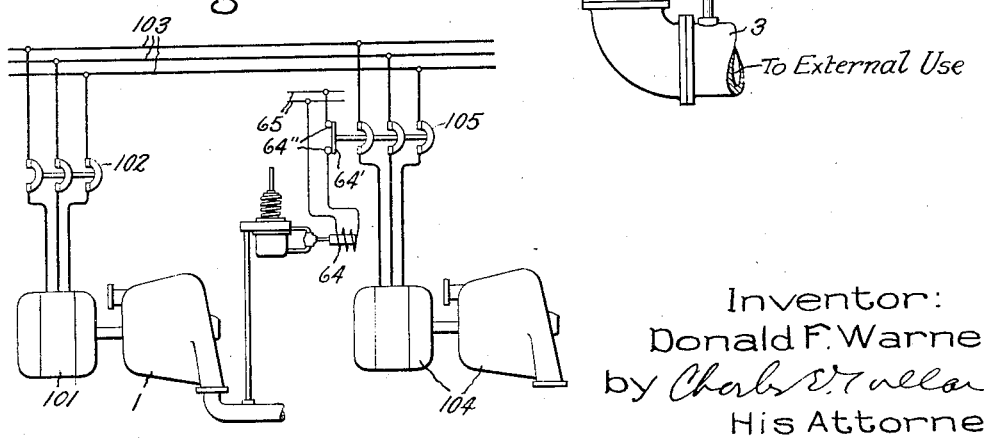
Inventor:
Donald F. Warner,
by Charles E. Tullar
        His Attorney.

Patented Dec. 26, 1933

1,941,372

UNITED STATES PATENT OFFICE 1,941,372

ELASTIC FLUID TURBINE

Donald F. Warner, Lynn, Mass., assignor to General Electric Company, a corporation of New York Application January 20, 1932. Serial No. 587,721

10 Claims. (Cl. 60—64)

The present invention relates to elastic fluid turbines, more particularly to back pressure or extraction turbines to which elastic fluid is supplied in terms of demand for elastic fluid in the exhaust or extraction stage respectively, although it is not necessarily limited thereto. The extracted or exhausted elastic fluid may be used for industrial purposes such as heating or the like. The speed of the type of turbines above specified is generally fixed by external means such as alternating current generators driven by other turbines and connected directly or indirectly to the same line and regulated to maintain constant the line frequency.

It is normally the practice to adjust the speed governors of extraction turbines so that they are inoperative at normal speed and only become operative at a speed slightly above normal. In the event that the connection with the external means, such as an electric line or equivalent frequency fixing means, is interrupted, the control of the turbine is transferred by a suitable mechanism from the back pressure governor to the speed governor. This transfer causes the speed to increase to a value corresponding to the setting of the speed governor which as already indicated is normally adjusted for pre-emergency actuation. The change of speed due to the transfer of the turbine from back pressure control to speed governor control is often undesirable.

The object of my invention is to provide an improved regulating mechanism for turbines of the type specified from which elastic fluid is exhausted or extracted and used for industrial purposes, whereby the control of the turbine may be changed from back pressure to speed governor control without causing a change in speed.

For a consideration of what I believe to be novel and my invention, attention is directed to the following description and the claims appended thereto in connection with the drawing which forms a part of my specification.

In the drawing, Fig. 1 shows, partly diagrammatic and partly in cross-section, a back pressure turbine provided with a regulating mechanism embodying my invention, and Fig. 2 shows a turbine embodying my invention in combination with a power line.

Referring to the drawing, 1 indicates an elastic fluid turbine having an inlet conduit 2 provided with a suitable valve mechanism 2a for controlling the supply of elastic fluid to the turbine. 3 designates the exhaust conduit of the turbine through which the elastic fluid is supplied from the turbine to an external plant. 4 designates a speed governor having flyweights 5 and being driven from the turbine shaft through suitable means indicated as a worm 6 and a gear 7 meshing with the worm. Connected to the weights 5 of the speed governor is the pilot valve stem 9 of a fluid actuated motor 10. Fastened to the stem are pilot valve heads 11 and 12. When weights 5 move outwardly, owing to an increase in speed, the pilot valve heads are moved downward, while when the weights move inwardly, owing to a decrease in speed, the valve heads are moved upward. Surrounding the pilot valve heads is a sleeve or bushing 13 provided with spaced ports or openings 14, 15 and 16. The bushing reciprocates in a valve casing 17 provided with three spaced annular grooves registering with the ports or openings 14, 15 and 16, respectively. The bushing is adapted to move upwardly and downwardly in casing 17. Oil or like fluid under substantially constant pressure is supplied through a passage 18 to the pilot valve, then through port 16 and passage 16' to the lower part of hydraulic cylinder 19. Oil may be drained off from cylinder 19 through passages 16 and 16' and ports 14 of the pilot valve sleeve. The pilot valve bushing 13 is connected by means of a stem 21 to a floating lever 22. The stem 21 has been shown as comprising two rods screw-threaded in opposite directions and connected with each other by a nut 23. By turning the nut, bushing 13 may be raised or lowered. This movement may be effected automatically by a motor 24 or manually by turning a knurled head 25. In the present instance motor 24 drives nut 23 through a gearing 23'. This mechanism represents a usual type of synchronizing arrangement such as disclosed by Patent No. 1,583,611 to Scott, May 4, 1926.

The right hand end of lever 22 is connected to stem 26 carrying at its lower end piston 20 movably arranged in the hydraulic cylinder 19 and normally forced in a downward direction by a spring 27 located between the piston and the upper part of the cylinder. The speed governor, the hydraulic motor and the pilot valve for controlling the motor so far described form a speed governing mechanism for regulating the turbine.

Connected to an intermediate point of lever 22 is a stem 28 of a motor controlled by a back pressure responsive device and forming in substance a means for controlling the supply of fluid to the turbine in response to back pressure conditions. The back pressure regulated fluid actuated motor 30 comprises a piston 29 fastened to stem 28 and movably arranged in a hydraulic cylinder 31. Spring 32 provided between the piston and the upper part of the hydraulic cylinder is a means for biasing the piston in downward direction. 33 designates a pilot valve having one port opening into the lower part of the hydraulic cylinder for controlling the motor. 34 and 35 are the valve heads and 36 and 37 the outlet and inlet conduits respectively of the pilot valve, which conduits are normally covered by the valve heads. The valve heads are carried by a stem 38 which in turn is connected to stem 28 of the hydraulic cylinder through a floating lever 39. The right hand end of lever 39 is pivoted to one end of link 40. The other end of link 40 is pivoted to one arm of a bell crank lever 41 which in turn has an adjustable fulcrum pivoted to a lever 42 fulcrumed at 43 and adjustable by means of a screw 44. The other end of bell crank lever 41 is connected through a link 45, and another bell crank lever 46 fulcrumed at 47 to the stem 48 of a pressure responsive device 49, or like apparatus responsive to a condition of the elastic fluid in the exhaust. With a condition I mean the pressure, the temperature, or like state of the fluid. The latter comprises a bellows 50 provided in a casing 51 and having a portion fastened to the lower end of stem 48. 52 designates a spring for biasing the bellows in downward direction. Bellows 50 and casing 51 define a space 53 which is filled with liquid such as water or the like and which in turn communicates through a conduit 54 with the liquid 55 in a tank 56. The free space of the latter is connected by means of a conduit 57 to the exhaust conduit 3 of the turbine to the effect that the liquid is subjected to the pressure of the exhaust. 58 designates a valve means provided in conduit 54, comprising a valve casing 59, a valve disk 60 secured to the end of stem 61 and forced against its seat by a spring 62. A solenoid core 63 surrounded by a coil 64 which in turn is fed from a suitable electric line, as indicated at 65, is connected to the other end of valve stem 61 and normally holds valve 60 open.

The back pressure responsive means is operative as long as valve 60 is in open position. Closing of valve 60 which is effected by the action of biasing spring 62 takes place when the supply of energy through line 65 fails. For this purpose one end of coil 64 is directly connected to line 65 and the other end of coil 64 is connected to line 65 through the intermediary of a member 64', closing contacts 64" which may be moved by a circuit breaker, as will be more clearly described hereafter in connection with Fig. 2.

Referring now to Fig. 2, where I have shown the arrangement shown in Fig. 1 in combination with a power line, 1 indicates the back pressure turbine having a control mechanism embodying my invention. 101 is an electric generator driven by said turbine and connected through a switch means 102 to a three-phase line 103. 104 indicates another turbo-generator set having its generator connected to line 103 by means of a circuit breaker 105. The generator of set 104 in this instance constitutes the frequency fixing means, that is, the turbine 104 is so regulated that the frequency of line 103 remains constant. 65 represents the electric source for supplying energy to coil 64. The circuit for coil 64 is closed through member 64' which connects 64" with each other and which maintains the contacts closed as long as switch 105 of generator 104 remains closed. If now the generator 104, that is, the frequency fixing means for line 103 fails, it will cause opening of circuit breaker 105, to the effect that the electric circuit for coil 65 of the back pressure controlled turbine 1 is opened. This automatically causes the locking of the back pressure responsive device, to the effect that the control of turbine is changed from back pressure control to speed governor control.

Referring again to Fig. 1, motor 30 and pressure responsive device 49 form a back pressure governor for the turbine, the motor itself being a means controlled or actuated by the pressure responsive device in terms of conditions of exhaust elastic fluid. The left hand end of lever 22 is connected through suitable means to the motor for controlling the inlet valve 2a of the turbine. The connecting means have been indicated in the present instance as a rod 66 pivoted to a fulcrumed lever 67 which in turn is connected by means of a link 67a to a floating lever 67b. The left hand end of the latter and an intermediate point thereof are connected to the pilot valve stem 68 and the piston stem 69 respectively of a fluid actuated motor 70 for moving valve 2a. 71 designates the hydraulic cylinder of the motor in which is movably arranged a piston 72 fastened to the lower end of stem 69 and carrying in alinement with stem 69 a valve stem 73 which forms an extension of stem 69. The upper and lower parts of the hydraulic cylinder are connected through conduits 74 and 75 to a pilot valve which includes valve heads 76 and 77 carried and moved by stem 68. 78 designates the inlet conduit for the pilot valve through which oil or like fluid may be supplied under substantially constant pressure to the hydraulic cylinder. 79 and 79' are the outlet conduits of the pilot valve through which fluid is drained off from the hydraulic cylinder.

The operation of the arrangement is as follows: Let us assume that the mechanism is shown in a balanced condition in which the hydraulic cylinder pistons 20 and 29 of motors 10 and 30 respectively occupy positions to permit elastic fluid to be supplied through valve 2a to the turbine. If now the pressure in the exhaust increases, owing to a decreased demand for exhaust elastic fluid, it will cause an increase in pressure in space 80 of tank 56 to the effect that a part of the fluid contained in the tank is displaced through conduit 54 into the lower tank or casing 51 causing collapsing of bellows 50 and accordingly upward movement of stem 48. This movement is transferred through lever mechanism 46, 45, 41, 40 and 39 to the pilot valve of fluid actuated motor 30 and causes downward movement of the valve heads to the effect that head 34 uncovers its port and permits oil to be supplied through conduit 37 into the lower part of the hydraulic cylinder, resulting in an upward movement of stem 28. This movement causes a corresponding movement of the pilot valve heads whereby they are restored to their original positions. The upward movement of piston stem 28 also causes a turning motion of lever 22 about its right hand end 81 as a fulcrum to the effect that rod 66 connected to the left hand end of this lever and sleeve 13 which is pivoted to the lever at 82 are moved upwardly. The upward movement of lever 66 effects through the fulcrumed lever 67, link 67a and floating lever 67b an upward movement of stem 68 of the pilot valve of 70 whereby oil or like fluid is supplied to the upper part of hydraulic cylinder 71 and drained off from the lower part thereof, resulting in a downward movement of piston 72 and a corresponding closing movement of inlet valve 2a. The elastic fluid supplied to the turbine is thereby decreased and the pressure in the exhaust maintained substantially constant. The upward movement of sleeve 13 of the fluid actuated motor 10 permits oil to be drained off from hydraulic cylinder 19 to the effect that piston 20 is forced downward by action of spring 27. The downward movement of piston stem 26 causes a similar motion of lever 22 to the effect that the pilot valve sleeve 13 is restored to its original position, providing the system frequency remains constant.

The downward movement of piston 20, in case valve 2a is moved toward its closed position in response to an actuation of the back pressure regulating mechanism, is an important result achieved by my invention as the effect of the above described setting of piston 20 by the action of the back pressure controlled motor 30 is that this piston assumes a position which corresponds to the opening of valve 2a of the turbine as long as the system frequency remains constant and accordingly the speed governor position is unaltered. Therefore, if the turbine is suddenly transferred from back pressure control to speed governor control, the hydraulic motor 10 is always in a position corresponding to the existing valve opening and therefore prevents a substantial change in speed during such transferring actuation between the two governing mechanisms. The transfer from back pressure control to speed governor control occurs when the connection with the external source is interrupted, as stated above, and is caused by biasing means 62 for valve 60. As soon as valve 60 is closed the back pressure responsive device becomes inoperative and the turbine is automatically put under speed governor control, the speed governor being set for normal speed.

The operation during speed governor control is as follows: An increase in speed causes outward movement of the weights 5 which effects a downward movement of pilot valve heads 11 and 12 to permit oil to be drained off from the hydraulic cylinder 19. This causes a downward movement of piston 20 and a turning motion of lever 22 about pivot 83 as fulcrum. The left hand end of lever 22 and rod 66 thereby are moved upward and cause the hydraulic motor 70 to close valve 2a in the manner described above. The supply of elastic fluid to the turbine thereby decreases, causing a decrease in speed.

It will be noted that an increase in speed has the same effect on piston 20 as an increase in back pressure while the turbine is under back pressure control. Both call for a downward movement of piston 20 as well as a closing actuation of valve 2a. The same is true with respect to a decrease in back pressure and a decrease in speed in which case the mechanism makes similar movement but in the opposite direction, resulting in an opening of valve 2a and an increase in supply of elastic fluid to the turbine. It is also noted that whereas the back pressure regulating mechanism causes setting of the hydraulic motor, more particularly of piston 20 of the speed governing mechanism, it has no effect on the speed governor itself.

During certain periods it is desirable to control the supply of fluid by the speed governor mechanism and to put the back pressure mechanism out of operation during this period. This is accomplished in my invention by the provision of a variable fulcrum for bell crank lever 41 and means for adjusting the fulcrum. It will be seen that turning of the right hand screw 44 in a counterclockwise direction causes lever 42 to turn about its fulcrum 43 in a counterclockwise direction to the effect that link 40 is moved downward, causing an upward movement of pilot valve stem 38. The valve head 34 of this valve thereby uncovers its port and permits the oil beneath piston 29 to be drained off through outlet conduit 36. It will be understood that the valve head 34 has to be moved a distance sufficient so that any change in back pressure may not effect a sufficient downward movement of valve head 34 to permit oil to be supplied to the hydraulic motor. The variable fulcrum of bell crank lever 41, lever 42 and screw 44 form in substance a means for manually locking the back pressure governing mechanism.

With my invention I have accomplished a reliable mechanism for governing an elastic fluid turbine under back pressure or extraction pressure control, as well as under speed governor control, whereby changes in speed during the transferring of the mechanism from back pressure or extraction pressure control to speed governor control are substantially prevented.

In accordance with the provisions of the patent statutes I have described the method of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. The combination of an elastic fluid engine having its speed normally externally fixed, a conduit connected to the engine through which elastic fluid is conveyed, a valve means for controlling the supply of elastic fluid to the engine, a speed governor set for normal speed, means including a motor actuated by the speed governor for causing movement of the valve means, means movable in response to a condition of elastic fluid in the conduit, and another means including another motor connected to the first named motor and actuated by the last named means for causing movement of the valve and setting of the speed governor actuated motor without affecting the speed governor.

2. The combination of an elastic fluid engine having its speed normally externally fixed, a conduit connected to the engine through which elastic fluid is conveyed, a valve means for controlling the supply of elastic fluid to the engine, a speed governor set for normal speed, a motor actuated by the speed governor for causing movement of the valve means, pressure responsive means subjected to the elastic fluid pressure in the conduit, and another motor connected to the first named motor and actuated by the pressure responsive means for causing movement of the valve and setting of the speed governor actuated motor without affecting the speed governor.

3. The combination of an elastic fluid engine having its speed normally externally fixed, a valve means for controlling the supply of elastic fluid to the engine, a conduit connected to a stage of the engine through which elastic fluid may be conveyed, a speed governor set for normal speed, a hydraulic motor actuated by the speed governor for causing movement of the valve means, pressure responsive means subjected to the elastic fluid pressure in the conduit, another hydraulic motor connected to the first named motor and actuated by the pressure responsive means for causing movement of the valve and setting of the speed governor actuated motor, and a locking means for the pressure responsive means whereby locking of the pressure responsive means causes transferring of the turbine regulation from back pressure control to speed governor control without substantial change in speed.

4. The combination of an elastic fluid turbine having its speed normally externally fixed, a valve means for controlling the supply of elastic fluid to the turbine, a conduit connected to a stage of the turbine through which elastic fluid is conveyed, a speed governor, a motor actuated by the speed governor for causing movement of the valve means, a pressure responsive device connected to the conduit, and a motor connected to the first named motor and actuated by the pressure responsive device for causing movement of the valve means and setting of the first named motor.

5. The combination of a back pressure turbine having its speed normally externally fixed, an inlet valve means for controlling the supply of elastic fluid to the turbine, a conduit connected to the exhaust for supplying elastic fluid to a plant, a speed governor, a motor controlled by the speed governor for causing movement of the valve means, a pressure responsive device subjected to the exhaust pressure, and another motor connected to the first named motor and actuated by the pressure responsive device for causing movement of the valve means and setting of the first named motor in terms of demand for elastic fluid in the exhaust.

6. The combination of a back pressure turbine having its speed normally externally fixed, an inlet valve means for controlling the supply of elastic fluid to the turbine, a conduit connected to the exhaust for supplying elastic fluid to a plant, a speed governor, a motor controlled by the speed governor for causing movement of the valve means, a pressure responsive device subjected to the exhaust pressure, another motor connected to the first named motor and actuated by the pressure responsive device for causing movement of the valve means and setting of the first named motor in terms of demand for elastic fluid in the exhaust, and automatically operated means for locking the pressure responsive device whereby the control of the turbine may be automatically transferred to the speed governor without substantial change in speed.

7. The combination of a back pressure turbine having its speed normally externally fixed, an inlet valve means for controlling the supply of elastic fluid to the turbine, a conduit connected to the exhaust for supplying elastic fluid to a plant, a speed governor, a motor controlled by the speed governor for causing movement of the valve means, a pressure responsive device subjected to the exhaust pressure, another motor connected to the first named motor and actuated by the pressure responsive device for causing movement of the valve means and setting of the first named motor in terms of demand for elastic fluid in the exhaust, and manually operated means for locking the regulating actuation of the back pressure responsive device whereby the control of the turbine is transferred to the speed governor without substantial change in speed.

8. The combination of a back pressure turbine having its speed normally externally fixed, a valve for controlling the supply of elastic fluid to the turbine, a back pressure responsive device, a motor controlled by the device for causing movement of the valve in terms of demand for elastic fluid in the exhaust, means for locking the device, a speed governor, and a fluid actuated motor controlled by the speed governor for controlling the valve when the pressure responsive device is locked, the fluid actuated motor being under control of the first named motor while the turbine is under back pressure control whereby the turbine control may be transferred from back pressure to speed governor control without substantial change in speed.

9. The combination of a back pressure turbine having its speed normally externally fixed, valve means for controlling the supply of elastic fluid to the turbine, a conduit connected to the exhaust for conveying exhaust elastic fluid to a plant, a speed governor, means actuated by the speed governor for causing movement of the valve means, pressure responsive means subjected to the pressure in the conduit, another means actuated by the pressure responsive means for causing movement of the valve means and setting of the speed governor actuated means in terms of demand for elastic fluid in the exhaust, the pressure responsive means including a cylinder, a bellows therein, a liquid between the bellows and the cylinder, a tank, liquid therein communicating with the liquid in the cylinder and subjected to the pressure in the conduit, and an electro-responsive valve means for automatically preventing communication between the tank and the cylinder.

10. The combination of a back pressure turbine having valve means for controlling the supply of elastic fluid to the turbine, a conduit connected to the exhaust, a speed governing mechanism including a motor and a back pressure governing mechanism including a motor connected to the first named motor for regulating the valve means, the motor of the speed governing mechanism being set by the back pressure mechanism, while the turbine is under back pressure control whereby the turbine control may be transferred from back pressure to speed governor control without substantial change in speed.

DONALD F. WARNER.